United States Patent
Wu et al.

(10) Patent No.: US 11,765,696 B2
(45) Date of Patent: Sep. 19, 2023

(54) SIDELINK RESOURCE ALLOCATION FOR DEVICE-TO-DEVICE COMMUNICATIONS

(71) Applicant: QUALCOMM Incorporated, San Diego, CA (US)

(72) Inventors: Shuanshuan Wu, San Diego, CA (US); Anantharaman Balasubramanian, San Diego, CA (US); Sudhir Kumar Baghel, Hillsborough, NJ (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 17/127,615

(22) Filed: Dec. 18, 2020

(65) Prior Publication Data

US 2021/0212027 A1 Jul. 8, 2021

Related U.S. Application Data

(60) Provisional application No. 62/951,873, filed on Dec. 20, 2019.

(51) Int. Cl.
*H04W 72/04* (2023.01)
*H04W 76/14* (2018.01)
*H04L 5/00* (2006.01)

(52) U.S. Cl.
CPC .......... *H04W 72/04* (2013.01); *H04L 5/0078* (2013.01); *H04W 76/14* (2018.02)

(58) Field of Classification Search
CPC ....... H04W 72/04; H04W 76/14; H04W 4/40; H04W 76/27; H04W 80/02; H04W 92/18;
(Continued)

(56) References Cited

U.S. PATENT DOCUMENTS

2019/0053204 A1 2/2019 Lien et al.
2020/0092692 A1* 3/2020 Wang .................... H04W 76/14
(Continued)

FOREIGN PATENT DOCUMENTS

WO 2019028847 A1 2/2019
WO 2019061180 A1 4/2019
(Continued)

OTHER PUBLICATIONS

WO 2018/171540 A1 (Year: 2018).*
(Continued)

*Primary Examiner* — Ian N Moore
(74) *Attorney, Agent, or Firm* — Loza & Loza, LLP

(57) ABSTRACT

Aspects relate to wireless communication devices configured to facilitate power conservation and sidelink communications. According to one example, a wireless communication device can transmit a first sidelink transmission, determine one or more sidelink resources for receiving a second sidelink transmission based at least in part on the resources used to transmit the first sidelink transmission, monitor the determined one or more sidelink resources, and receive via the transceiver the second sidelink transmission on the monitored one or more sidelink resources. According to another example, a wireless communication device can receive a first sidelink transmission, determine one or more sidelink resources for transmitting a second sidelink transmission based at least in part on the received first sidelink transmission, and transmit the second sidelink transmission on the one or more of the determined sidelink resources.

24 Claims, 13 Drawing Sheets

(58) Field of Classification Search
CPC ... H04L 5/0078; H04L 1/1822; H04L 1/0003; H04L 1/1685; H04L 1/1819; H04L 1/1848; H04L 1/1861; H04L 1/1864; H04L 1/188; H04L 1/1893; H04L 1/1896; H04L 5/0082; H04L 1/1854; H04L 5/0055; H04L 5/00; H04L 5/003; H04L 5/0053
See application file for complete search history.

(56) References Cited

U.S. PATENT DOCUMENTS

| | | | |
|---|---|---|---|
| 2020/0112982 A1* | 4/2020 | Li | H04L 1/1819 |
| 2020/0145867 A1* | 5/2020 | Tseng | H04W 48/16 |
| 2021/0204283 A1* | 7/2021 | Zhao | H04W 72/02 |
| 2021/0235421 A1* | 7/2021 | Xing | H04L 5/0094 |
| 2021/0400635 A1* | 12/2021 | Blasco Serrano | H04L 1/1896 |

FOREIGN PATENT DOCUMENTS

| | | |
|---|---|---|
| WO | 2020056608 A1 | 3/2020 |
| WO | 2020091683 A1 | 5/2020 |

OTHER PUBLICATIONS

WO 2020/056608 A1 (Year: 2018).*
WO 2020/091683 A1 (Year: 2019).*
International Search Report and Written Opinion—PCT/US2020/066270—ISA/EPO—dated Apr. 15, 2021.

* cited by examiner

SIDELINK RESOURCE ALLOCATION FOR DEVICE-TO-DEVICE COMMUNICATIONS

PRIORITY CLAIM

This application claims priority to and the benefit of provisional patent application No. 62/951,873 filed in the United States Patent Office on Dec. 20, 2019, the entire content of which is incorporated herein by reference as if fully set forth below in its entirety and for all applicable purposes.

TECHNICAL FIELD

The technology discussed below relates generally to wireless communication systems, and more particularly, to access control in device-to-device wireless communications.

INTRODUCTION

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power).

5G New Radio (NR) networks can exhibit a higher degree of flexibility and scalability than 4G Long Term Evolution (LTE), and are envisioned to support very diverse sets of requirements. In general, wireless devices can access an NR network via one or more network entities (e.g., base stations). Some wireless devices can communicate with each other using sidelink signals without relaying that communication through a base station of the NR network. In some examples, a wireless device may function as a scheduling entity to schedule resources and communicate sidelink signals with other wireless devices without relying on scheduling or control information from a base station. In some examples, a base station may allocate wireless resources to the wireless devices for performing sidelink communication.

BRIEF SUMMARY

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects and implementations of the present disclosure facilitate device-to-device communications as well as reduced power consumption in wireless communication devices operating in wireless communications systems.

In at least one aspect of the present disclosure, wireless communication devices are provided. In at least one example, a wireless communication device may include a transceiver, a memory, and a processing circuit coupled to the transceiver and the memory. The processing circuit and memory may be configured to transmit a first sidelink transmission using a wireless communication resource via the transceiver, determine one or more sidelink resources for receiving a second sidelink transmission based at least in part on the wireless communication resource used to transmit the first sidelink transmission, monitor the determined one or more sidelink resources, and receive via the transceiver the second sidelink transmission on the monitored one or more sidelink resources.

In at least one aspect, a wireless communication device may include a transceiver, a memory, and a processing circuit coupled to the transceiver and memory. The processing circuit and memory may be configured to receive a first sidelink transmission using a wireless communication resource via the transceiver, determine one or more sidelink resources for transmitting a second sidelink transmission based at least in part on the wireless communication resource used to receive the first sidelink transmission, and transmit via the transceiver the second sidelink transmission on the one or more of the determined sidelink resources.

Further aspects provide methods of wireless communication and/or apparatus for wireless communication including means to perform such methods. One or more examples of such methods may include transmitting a first sidelink transmission using a wireless communication resource, determining one or more sidelink resources for receiving a second sidelink transmission based at least in part on the wireless communication resource used to transmit the first sidelink transmission, monitoring the determined one or more sidelink resources, and receiving the second sidelink transmission on the monitored one or more sidelink resources.

One or more further examples of such methods may include receiving a first sidelink transmission using a wireless communication resource, determining one or more sidelink resources for transmitting a second sidelink transmission based at least in part on the wireless communication resource used to receive the first sidelink transmission, and transmitting the second sidelink transmission on the one or more determined sidelink resources.

Still further aspects of the present disclosure include computer-readable storage mediums storing processor-executable software. In at least one example, the processor-executable software may be adapted to cause a processing circuit to transmit a first sidelink transmission using a wireless communication resource, determine one or more sidelink resources for receiving a second sidelink transmission based at least in part on the wireless communication resource used to transmit first sidelink transmission, monitor the determined one or more sidelink resources, and receive the second sidelink transmission on the monitored one or more sidelink resources.

In at least one example, the processor-executable software may be adapted to cause a processing circuit to receive a first sidelink transmission using a wireless communication resource, determine one or more sidelink resources for transmitting a second sidelink transmission based at least in part on the wireless communication resource used to receive the first sidelink transmission, and transmit the second sidelink transmission on the one or more determined sidelink resources.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to order to avoid obscuring such concepts.

While some aspects are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Figure 1:
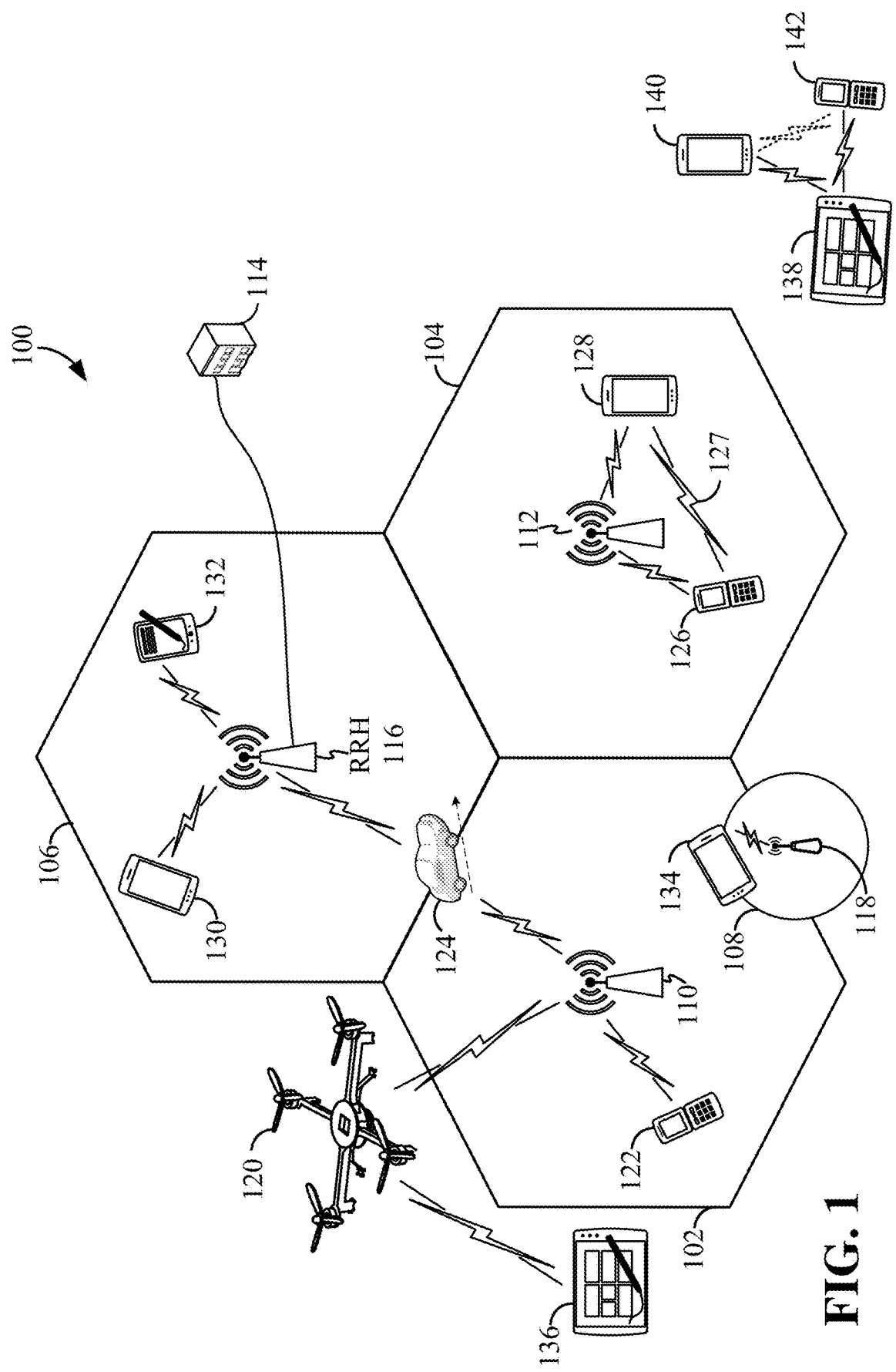
FIG. 1 is a schematic diagram illustrating an example of a wireless communication system according to one or more aspects.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In another example, a mobile network node (e.g., quadcopter 120) may be configured to function as a UE. For example, the quadcopter 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality. The RAN 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and radio frame timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the RAN 100. Each of the cells may measure a strength of the pilot signal, and the RAN (e.g., one or more of the base stations 110 and 114/116 and/or a central node within the core network) may determine a serving cell for the UE 124. As the UE 124 moves through the RAN 100, the network may continue to monitor the uplink pilot signal transmitted by the UE 124. When the signal strength or quality of the pilot signal measured by a neighboring cell exceeds that of the signal strength or quality measured by the serving cell, the RAN 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks can enable uplink-based mobility framework and improve efficiency of both the UE and the network. Efficiencies may be brought about because the number of mobility messages that need to be exchanged between the UE and the network may be reduced.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using peer to peer (P2P) or sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a P2P network, a device-to-device (D2D) network, vehicle-to-vehicle (V2V) network, a vehicle-to-everything (V2X), a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

Figure 2:
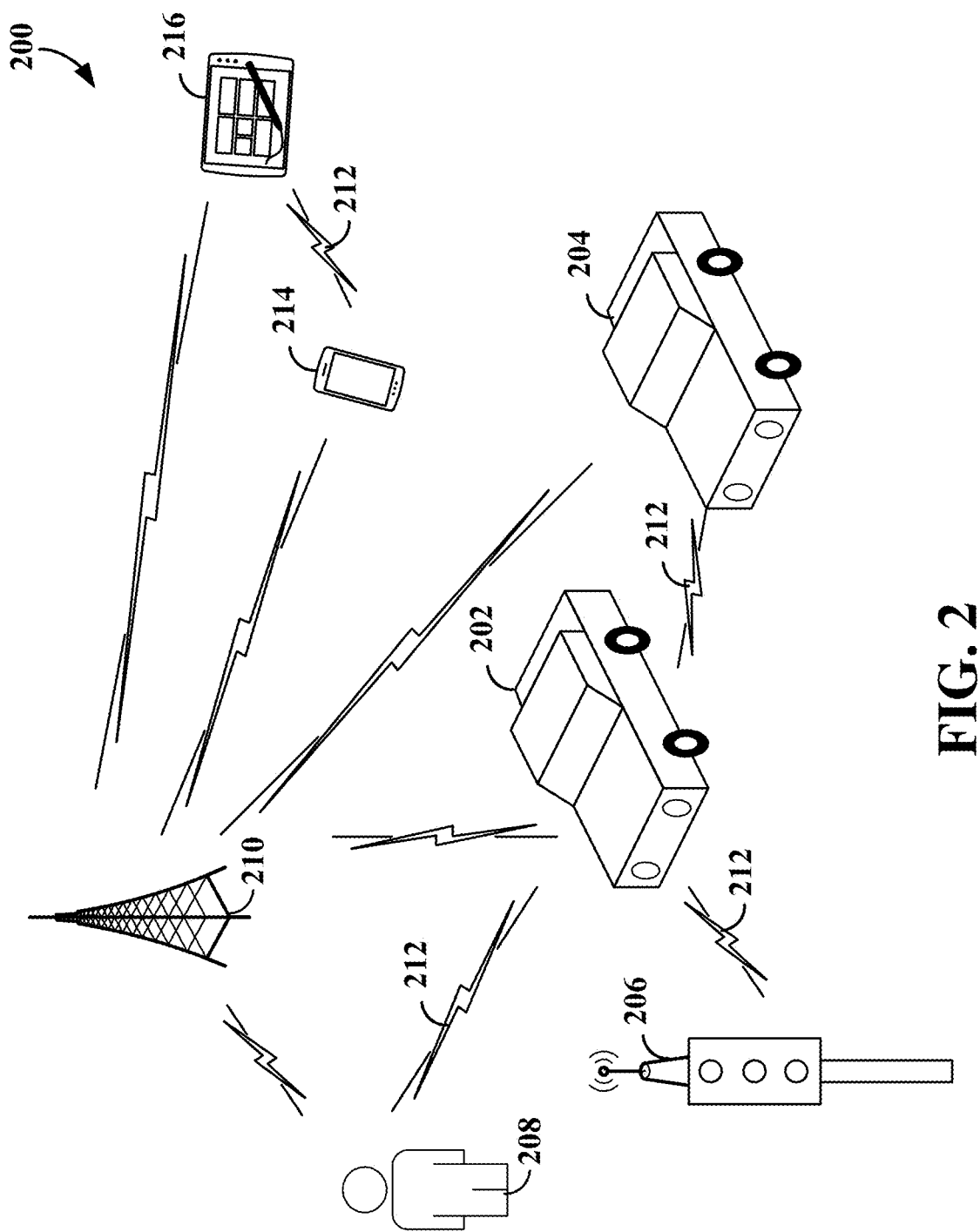
FIG. 2 is a diagram illustrating an example of a radio access network according to some aspects.

FIG. 2 illustrates an example of a wireless communication network 200 configured to support D2D or sidelink communication. In some examples, sidelink communication may include V2X communication. V2X communication involves the wireless exchange of information directly between not only vehicles (e.g., vehicles 202 and 204) themselves, but also directly between vehicles 202/204 and infrastructure (e.g., roadside units (RSUs) 206), such as streetlights, buildings, traffic cameras, tollbooths or other stationary objects, vehicles 202/204 and pedestrians 208, and vehicles 202/204 and wireless communication networks (e.g., base station 210). In some examples, V2X communication may be implemented in accordance with the New Radio (NR) cellular V2X standard defined by 3GPP, Release 16, or other suitable standard.

V2X communication enables vehicles 202 and 204 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 202 and 204 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 208 may be utilized to trigger a warning sound, vibration, flashing light, etc., in case of imminent danger.

The sidelink communication between vehicle-UEs (V-UEs) 202 and 204 or between a V-UE 202 or 204 and either an RSU 206 or a pedestrian-UE (P-UE) 208 may occur over a sidelink 212 utilizing a proximity service (ProSe) PC5 interface. In various aspects of the disclosure, the PC5 interface may further be utilized to support D2D sidelink 212 communication in other proximity use cases. Examples of other proximity use cases may include public safety or commercial (e.g., entertainment, education, office, medical, and/or interactive) based proximity services. In the example shown in FIG. 2, ProSe communication may further occur between UEs 214 and 216.

ProSe communication may support different operational scenarios, such as in-coverage, out-of-coverage, and partial coverage. Out-of-coverage refers to a scenario in which UEs (e.g., V-UEs 202 and 204 and P-UE 208) are outside of the coverage area of a base station (e.g., base station 210), but each are still configured for ProSe communication. Partial coverage refers to a scenario in which some of the UEs (e.g., V-UE 204) are outside of the coverage area of the base station 210, while other UEs (e.g., V-UE 202 and P-UE 208) are in communication with the base station 210. In-coverage refers to a scenario in which UEs (e.g., UEs 214 and 216) are in communication with the base station 210 (e.g., gNB) via a Uu (e.g., cellular interface) connection to receive ProSe service authorization and provisioning information to support ProSe operations.

To facilitate D2D sidelink communication between, for example, UEs 214 and 216 over the sidelink 212, the UEs 214 and 216 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 212. For example, the discovery signal may be utilized by the UE 216 to measure the signal strength and channel status of a potential sidelink (e.g., sidelink 212) with another UE (e.g., UE 214). The UE 216 may utilize the measurement results to select a UE (e.g., UE 214) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 210).

In addition, there may be two main resource allocation modes of operation for sidelink (e.g., PC5) communications. In a first mode, Mode 1, a base station (e.g., gNB) 210 may allocate resources to sidelink devices (e.g., V2X devices or other sidelink devices) for sidelink communication between the sidelink devices in various manners. For example, the base station 210 may allocate sidelink resources dynamically (e.g., a dynamic grant) to sidelink devices, in response to requests for sidelink resources from the sidelink devices. The base station 210 may further activate preconfigured sidelink grants (e.g., configured grants) for sidelink communication among the sidelink devices. In Mode 1, sidelink feedback may be reported back to the base station 210 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink 212 is the same between the two modes. Therefore, from a receiver's point of view, there is no difference between the modes.

Various aspects of the present disclosure will be described with reference to an OFDM resource grid, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
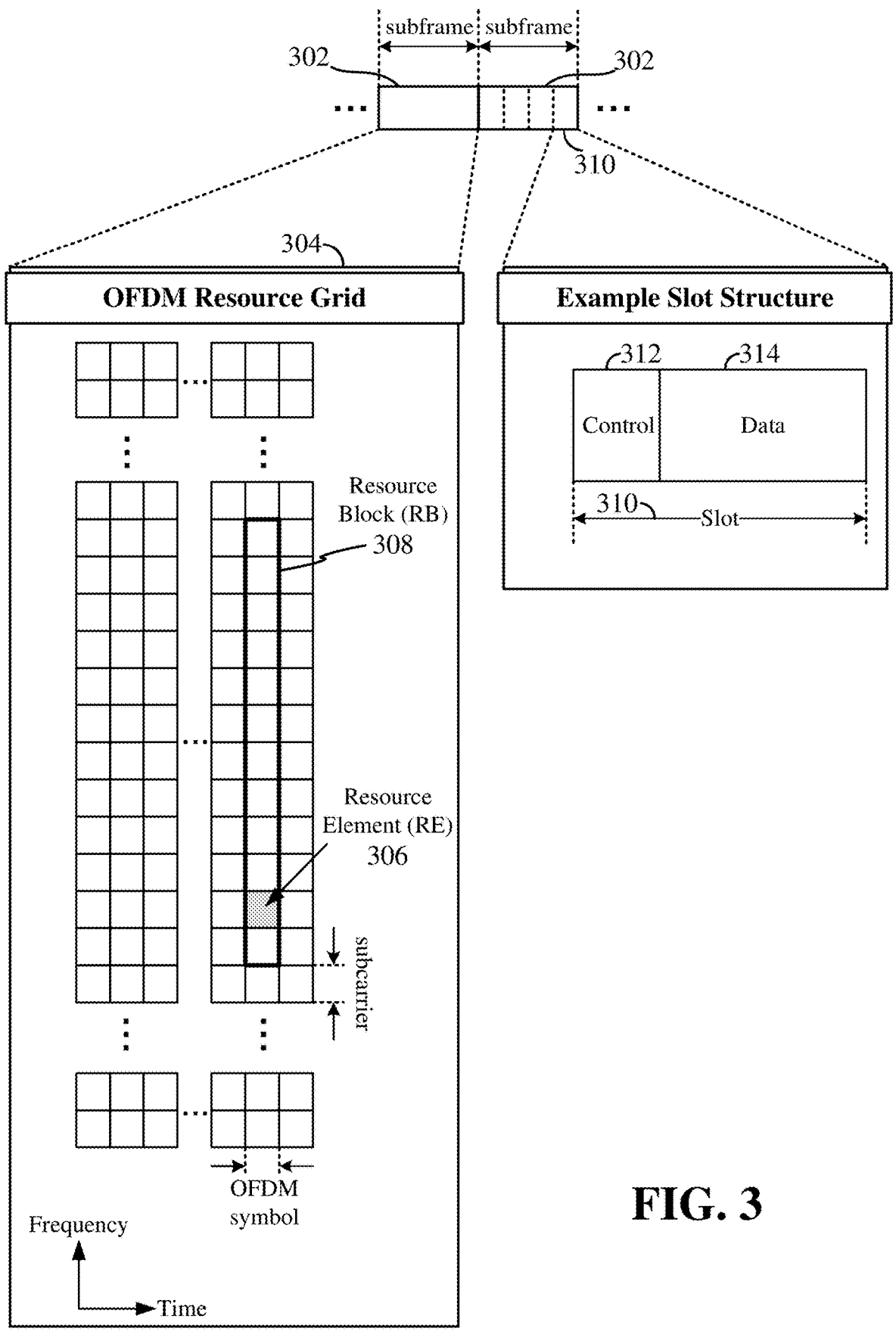
FIG. 3 is a diagram illustrating an exemplary communication resource grid according to some aspects.

Referring now to FIG. 3, an expanded view of an exemplary subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols, and frequency is in the vertical direction with units of subcarriers or tones of the carrier.

The resource grid 304 may be used to schematically represent time-frequency resources for a given antenna port. That is, in a multiple-input multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. In some aspects, a single RB such as the RB 308 entirely corresponds to a single direction of communication (either transmission or reception for a given device).

Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE implementing D2D or sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each subframe 302 (e.g., a 1 ms subframe) may consist of one or multiple adjacent slots. In the example shown in FIG. 3, one subframe 402 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates an exemplary slot format (slots 310). A slot format can include a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The slot structures illustrated in FIG. 3 are merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices and a groupcast communication is delivered to a group of intended recipient devices. A unicast communication may refer to a point-to-point transmission by one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a certain periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., V2X or other sidelink device) towards a set of one or more other receiving sidelink devices. In some examples, the sidelink control information may include synchronization information to synchronize communication by a plurality of sidelink devices on the sidelink channel. In some examples, the SCI may include information that indicates the location or distance of the transmitting device. In addition, the SCI may include decoding information for a physical sidelink shared channel (PSSCH) transmitted within the data region 314 of the slot. The PSSCH can include sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 320 from the receiving sidelink device to the transmitting sidelink device. In addition, one or more reference signals, such as a sidelink SSB and/or a sidelink CSI-RS, may be transmitted within the slot 320.

The channels or carriers described above and illustrated in FIGS. 1-3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

In sidelink communications, data transmitted by one UE may only be relevant to one or more specific UEs, e.g., UE(s) in range to receive the transmission or UE(s) configured to response to the data transmission. In some instances, a UE involved in sidelink communications may operate on a limited power source, such as a battery. It may not be beneficial for a UE operating on such a limited power source to continuously monitor other UEs' sidelink transmissions. According to one or more aspects of the present disclosure, UEs may be adapted to facilitate access control in sidelink communications. In some implementations, such access control for sidelink communications may facilitate power savings in one or more wireless communication devices.

Figure 4:
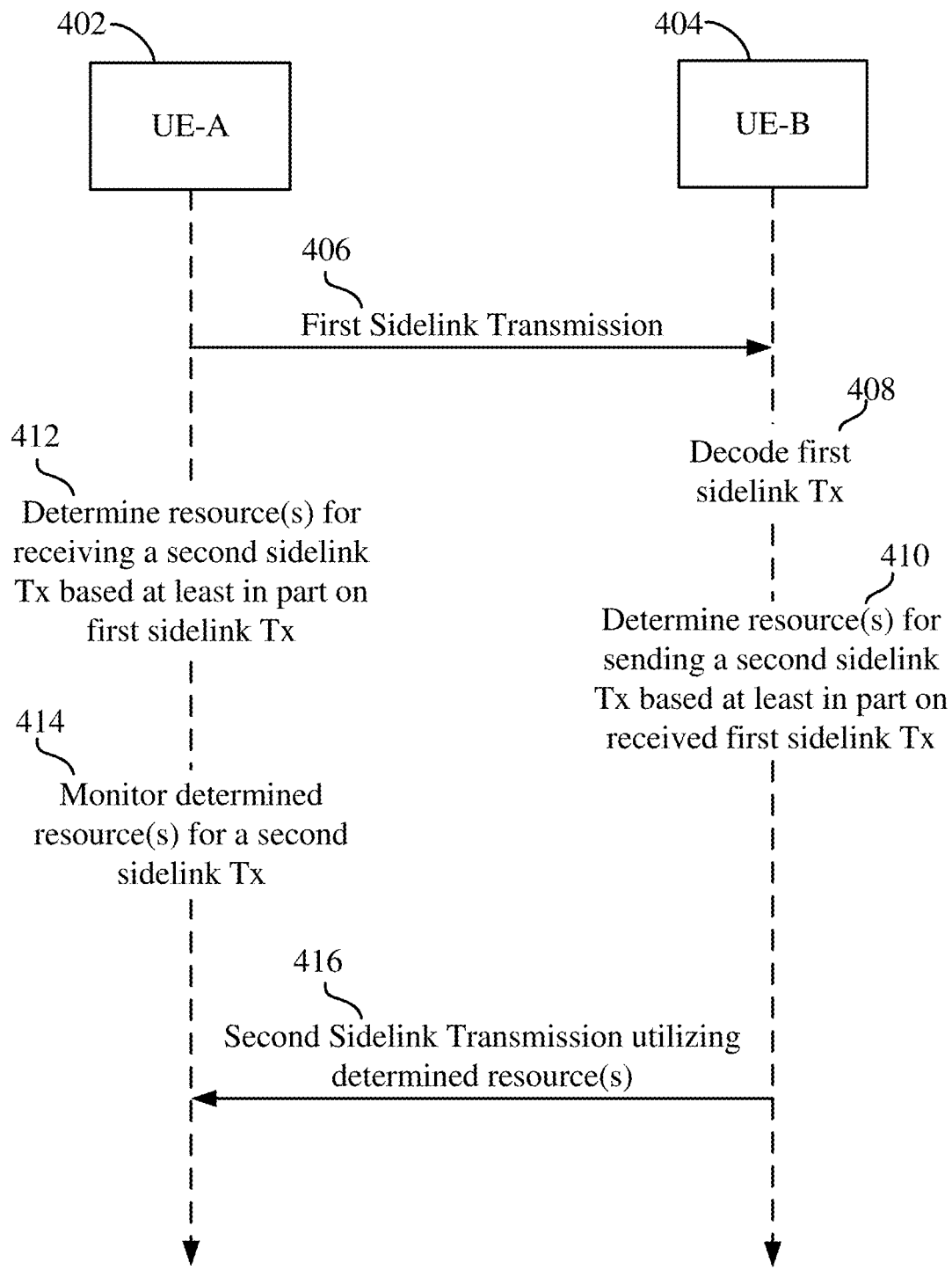
FIG. 4 is a flow diagram depicting communications between two UEs, including at least one power-sensitive UE.

According to one or more aspects of the present disclosure, resource allocation for a sidelink transmission between two UEs may be determined based at least in part on a previous sidelink transmission. For example, FIG. 4 is a flow diagram depicting communications between two UEs, a first UE (UE-A) 402, and a second UE (UE-B) 404. In this example, UE-A 402 may be a power-sensitive UE (e.g., battery-powered UE). As indicated, UE-A 402 may send a first sidelink transmission 406 that is received by UE-B 404. UE-B 404 may decode 408 the received first sidelink transmission 406 from UE-A 302. Decoding the first sidelink transmission 406 can enable UE-B 404 to retrieve information (e.g., a safety message from UE-A 402) carried in the first sidelink transmission 406.

At 410, UE-B 404 may determine one or more sidelink resources on which to send a reply transmission, where the one or more sidelink resources can be determined based at least in part on the received first sidelink transmission 406. Similarly, at 412, UE-A 402 may determine one or more sidelink resources for receiving a reply transmission, where the one or more sidelink resources are determined based at least in part on the first sidelink transmission 406 sent by UE-A 402. Once UE-A 402 determines which sidelink resource(s) may be used for receiving the reply sidelink transmission, at 414, UE-A 402 monitors the determined sidelink resource(s) for the second sidelink transmission. UE-B 404 similarly utilizes the determined sidelink resource(s) to send the second sidelink transmission 416.

In some aspects, the resources for the second sidelink transmission 416 can be determined, implied, preconfigured, or predefined at least in part based on the resources used for transmitting the first sidelink transmission 406. Therefore, UE-A 402 can monitor the sidelink resource(s) for the second sidelink transmission 416, and may be able to power down some components to reduce power consumption during the other sidelink resources outside of the sidelink resource(s) for the second sidelink transmission 416. In this way, UE-A 302 can conserve power resources. When the first sidelink transmission 406 implies the resources of the second sidelink transmission 416, the first sidelink transmission 406 does not include an express indication of the resources of the second sidelink transmission 416. In this case, UE-B 404 can determine the resources expected to be used for the second sidelink transmission 416 according to the resources used by UE-A for sending the first sidelink transmission 406.

In one aspect, the sidelink resource(s) utilized by UE-A 402 to send the first sidelink transmission 406 may indicate one or more sidelink resources to be utilized to send the second sidelink transmission 416 from UE-B 404 to UE-A 402. Examples of sidelink resources can include time (e.g., slots) and frequency (e.g., subcarriers) resources for sidelink communication. By way of example, the first sidelink transmission 406 may indicate a single sidelink resource and/or a single sidelink resource window to utilize for transmitting the second sidelink transmission 416. In some aspects, a single sidelink resource may include an RB (e.g., RB 308). In some aspects, a single sidelink resource window may include a time slot. In another example, the first sidelink transmission 406 may indicate multiple sidelink resources and/or multiple sidelink resource windows. In still other examples, the first sidelink transmission 406 may indicate one or more periodic resources. Such a periodic resource may be indicated by a starting location, period, window size, etc., which may be implied or indicated by UE-A 402, configured (e.g., by a base station), or preconfigured.

Figure 5:
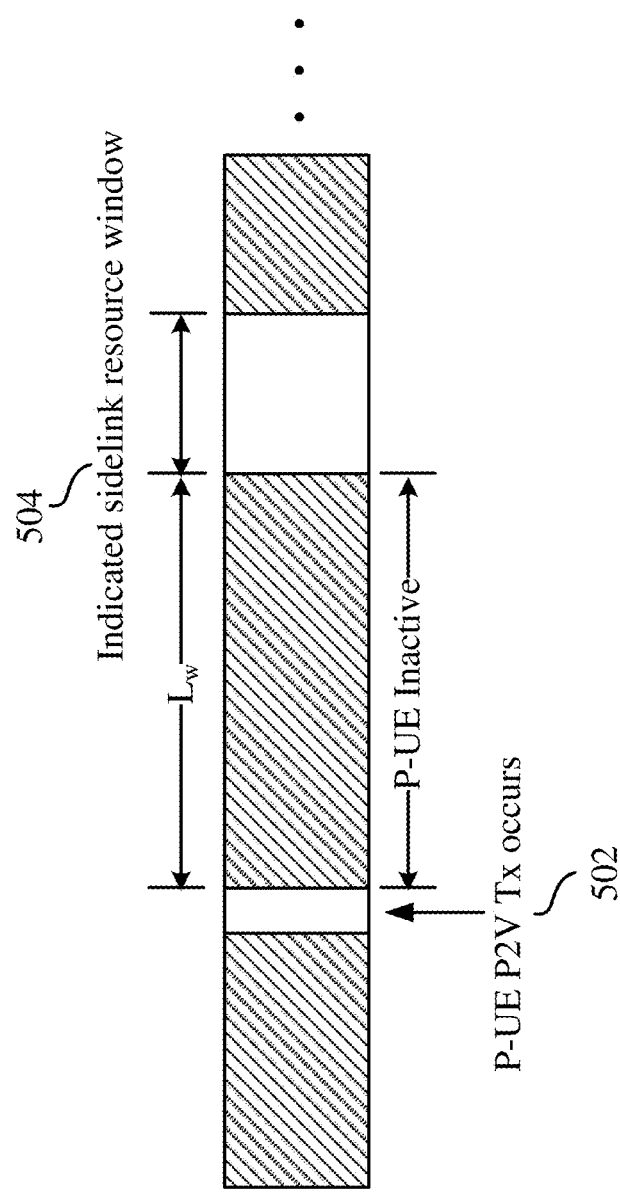
FIG. 5 is a block diagram depicting a first exemplary timing of sidelink communication between a pedestrian UE (P-UE) and a vehicle UE (V-UE) according to one aspect.

Referring now to FIG. 5, a block diagram is shown depicting a specific implementation of sidelink communication according to at least one aspect. In this example, UE-A 402 in FIG. 4 may be a pedestrian UE (P-UE) and UE-B 404 may be a vehicle UE (V-UE). In such an example, the first sidelink transmission 502 sent by the P-UE can include a pedestrian safety message (PSM). The P-UE can use the PSM to indicate the presence of a pedestrian in the proximity of the V-UE. The first sidelink transmission 502 can include an indication, either express or implied, of one or more resources to be utilized for sending a second sidelink transmission by the V-UE in response to the first sidelink transmission.

In this example, the indicated resource can be a resource window 504, during which the P-UE expects a V-UE to respond to the first sidelink transmission. As shown, the indicated sidelink resource window 504 is located a relatively long time after the first sidelink transmission 502 was sent. Because the P-UE knows when a response is to be sent, the P-UE can power down one or more components (e.g., a transceiver and/or RF circuit) to save power resources until the indicated sidelink resource window 504 starts. The P-UE can then power on one or more components to monitor for a transmission during the indicated sidelink resource window, and the V-UE can send a second sidelink transmission during that indicated sidelink resource window 504.

Figure 6:
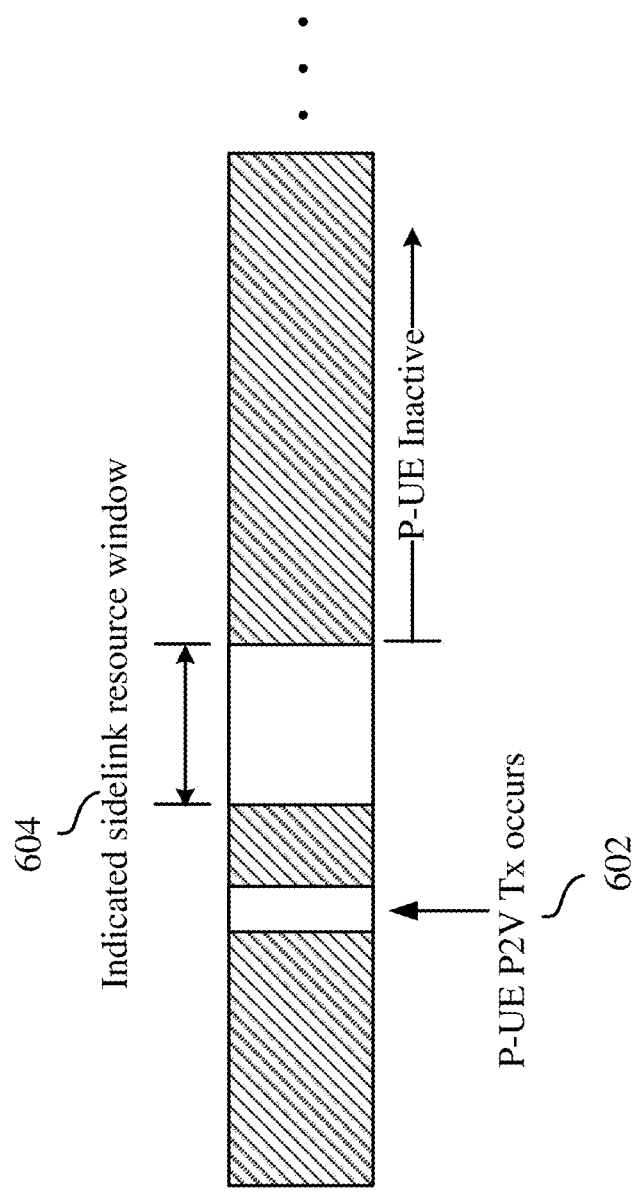
FIG. 6 is a block diagram depicting a second exemplary timing of sidelink communication between a P-UE and a V-UE according to one aspect.

FIG. 6 is a block diagram illustrating another example of sidelink communication similar to FIG. 5. In FIG. 6, the time period between a first sidelink transmission 602 from the P-UE and the start of the indicated sidelink resource window 604 may be relatively short. The process of powering down and power up one or more circuits (e.g., a transceiver and/or RF circuit) for monitoring the indicated sidelink resource window 604 can require a certain amount of power to be used. In this example of FIG. 6, the P-UE can maintain its receiver circuits (e.g., a transceiver) powered on to monitor the indicated sidelink resource window 604, as a result of the relatively short time between the first sidelink transmission 602 and sidelink resource window 604. As a result, the P-UE can avoid the power expenditure associated with powering off and powering on the circuits used for monitoring the indicated sidelink resource window 604 until after the resource window has ended.

In some aspects of the present disclosure, the allocation of sidelink resources may be done autonomously. Autonomous allocation or indication of sidelink resources refers to the selection and identification of sidelink resources by the UEs (e.g., P-UE and V-UE) participating in the sidelink communications, without any interaction with a scheduling entity such as a base station (e.g., a scheduling entity 108).

Figure 7:
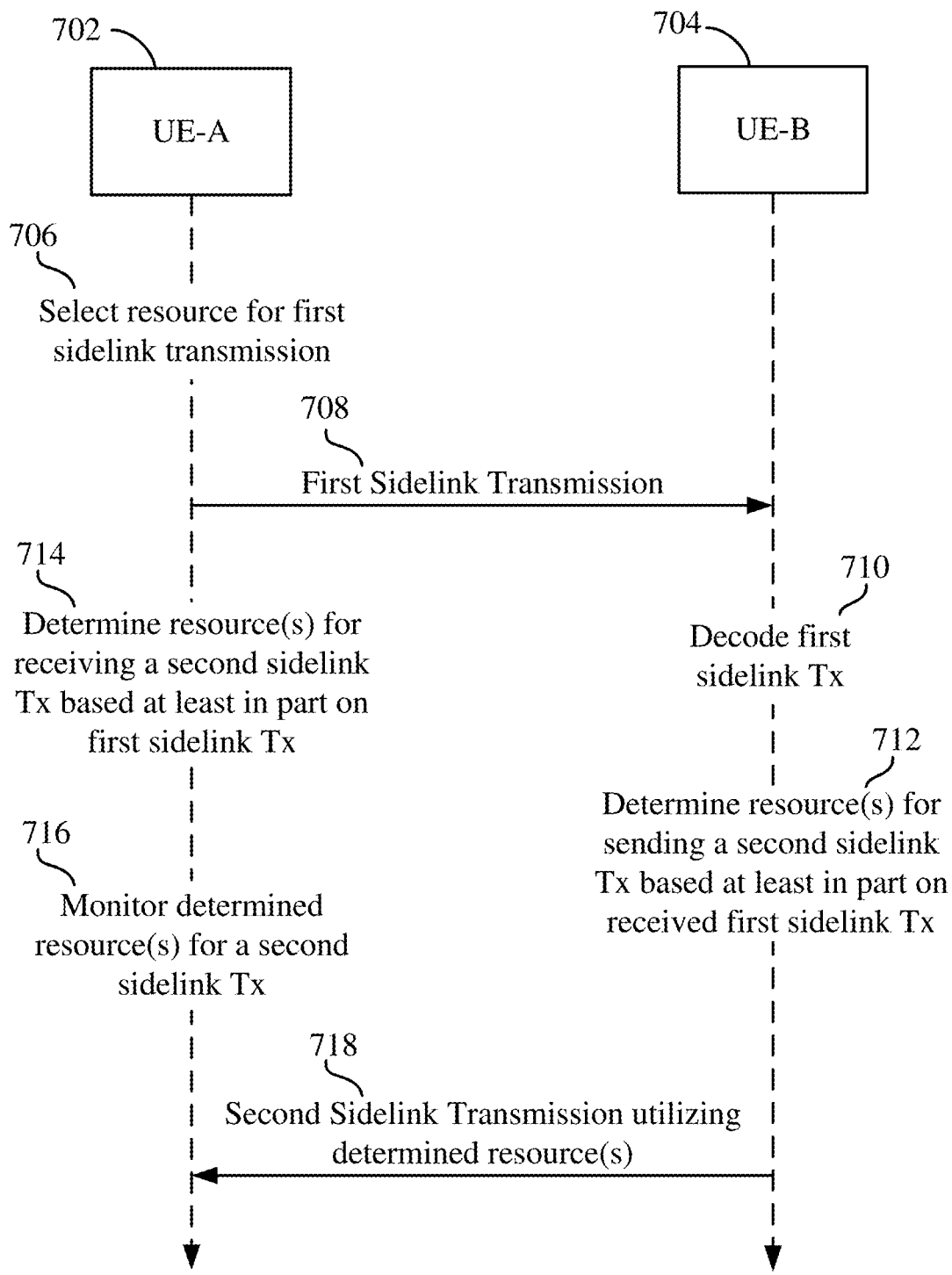
FIG. 7 is a flow diagram depicting an implementation of autonomous resource allocation in sidelink communication according to at least one aspect.

FIG. 7 is a flow diagram depicting autonomous resource allocation between UE-A 702 and UE-B 704 according to one aspect. Initially, at 706, UE-A 702 can select a resource (e.g., time and frequency resource) from allotted sidelink resources to utilize in sending a first sidelink transmission 708. In some aspects, UE-A 702 can select the time/frequency resource randomly from the sidelink resources. In other examples, UE-A 702 may select the sidelink time/frequency resource based on sensing (e.g., Listen Before Talk (LBT)) the resources. Such sensing may include the UE-A 702 monitoring the sidelink resources for a period of time to determine which sidelink resources are available for use by the UE-A 702. For example, UE-A 702 may determine that certain sidelink resources are available when the signal energy or strength (e.g., received signal strength indicator (RSSI)) detected or monitored by UE-A is below a certain threshold.

UE-A 702 sends the first sidelink transmission 708 on the selected sidelink time and frequency resources. UE-B 704 receives the first sidelink transmission 708, and at 710 and 712, decodes the received first sidelink transmission 708, and determines the resource(s) to utilize for sending a second sidelink transmission. At 714, UE-A 702 also determines one or more resources that are available for use by UE-B 704 for sending the second sidelink transmission based on the first sidelink transmission. Then, at 716, UE-A 702 monitors the determined resource(s) for the second sidelink transmission. As indicated in FIG. 7, UE-B 704 can send the second sidelink transmission 718 utilizing the determined resources, or a portion of the determined resources.

UE-A 702 and UE-B 704 may determine the resource(s) to be used for the second sidelink transmission based on the time and frequency location of the first sidelink transmission 708. For example, a certain time/frequency location used by the first sidelink transmission 708 may map to one or more sidelink resources that can be used for the second sidelink transmission. In examples where the first sidelink transmission indicates a specific resource or resource window, the time location may be determined from the frame number or slot number of the slot for the data transmission, or the corresponding sidelink control information (SCI) transmission. The frequency location may be determined from the starting resource block or subchannel for the data transmission or the corresponding SCI transmission. In examples where the first sidelink transmission indicates a set of resources that UE-B 704 can select from, UE-B 704 can select a resource from the set of resources for the second sidelink transmission randomly or based on sensing/LBT.

When autonomously determining one or more resources that can be utilized by UE-B 704 for sending the second sidelink transmission, a time interval from the first sidelink transmission 708 to the indicated resource(s) may be conveyed between UE-A 702 and UE-B 704. The time interval between the first sidelink transmission 708 and the indicated sidelink resource window may be referred to as $L_w$ (see, e.g., FIG. 5). This time interval $L_w$ may be expressly identified by UE-A 702, configured, preconfigured, predefined, or implied. The time interval $L_w$ may be implied by the priority level indicated in the first sidelink data transmission 708 from UE-A 702, where each possible priority level can be associated with a different time interval $L_w$, for example, a higher priority implies a smaller interval. When the time interval $L_w$ between the first sidelink transmission 708 and the resource(s) to be utilized by UE-B 704 for the second sidelink transmission is expressly indicated by UE-A 702 in the first sidelink transmission 708, the time interval $L_w$ may be indicated by a parameter in the SCI transmitted by UE-A 702.

The time interval $L_w$ between the first sidelink transmission 708 and the indicated resource(s) for sending the second sidelink transmission 718 may be expressed by physical slots or by logical slots. Sidelink transmissions by each of UE-A 702 and UE-B 704 occur in a resource pool for sidelink transmissions. In some aspects, the resource pool may include non-consecutive physical slots. In such implementations employing non-consecutive physical slots, the time interval $L_w$ may be expressed by the logical slot instead of the physical slot.

When autonomously determining the one or more resources for the second sidelink transmission by UE-B 704, the size of the resource set may be expressly indicated, configured, preconfigured, predefined, or implied. The size of the resource set may include a number of slots and/or a number of resource blocks (e.g., RB 308). The size of the resource set may be expressly indicated by UE-A 702 in an SCI transmitted by the UE-A 702.

Figure 8:
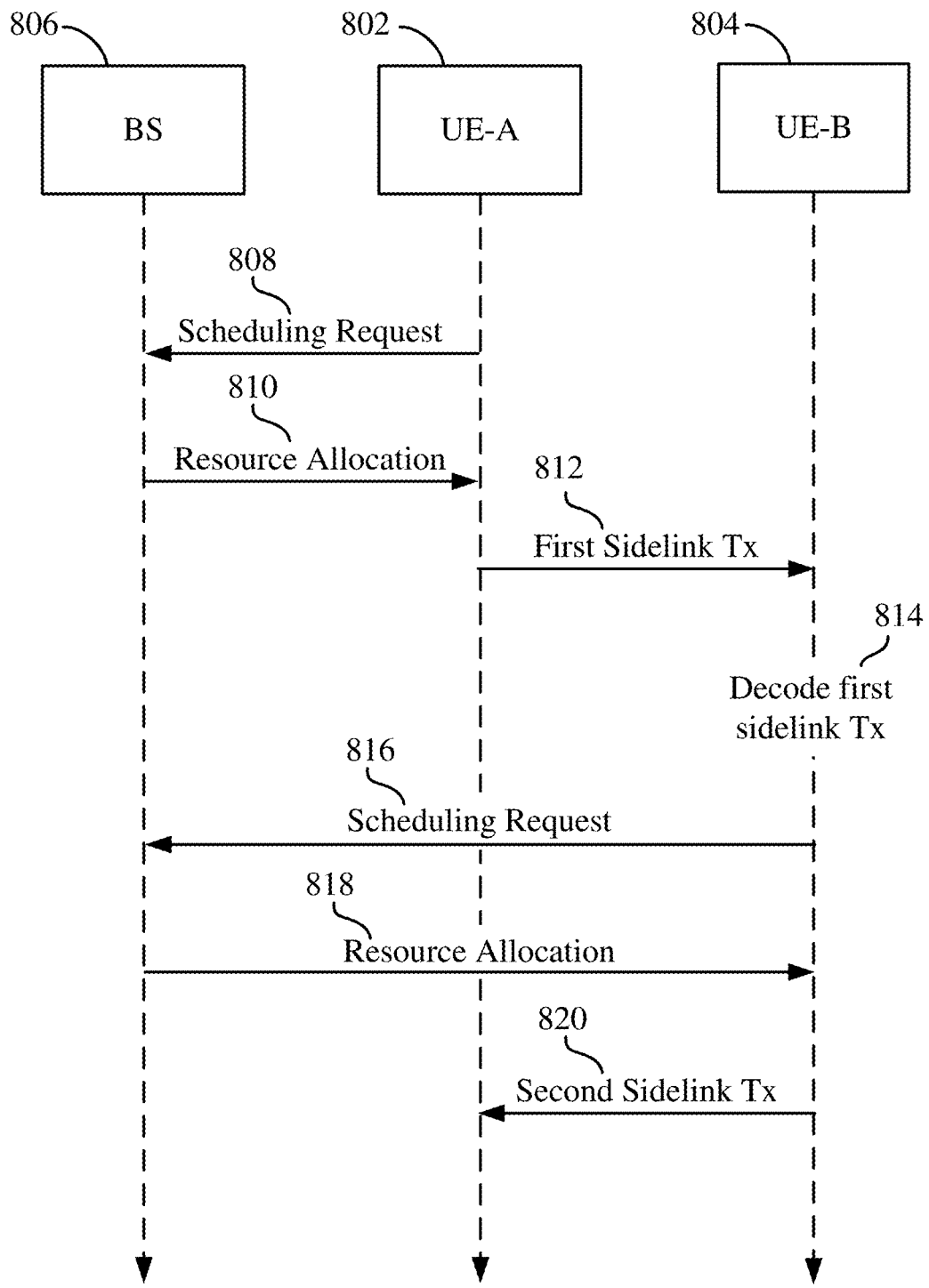
FIG. 8 is a flow diagram depicting an implementation of scheduled resource allocation in sidelink communication according to at least one aspect.

In some aspects of the present disclosure, the allocation of sidelink resources may be performed by a scheduling entity. FIG. 8 is a flow diagram depicting an implementation of sidelink resource allocation according to one aspect. In this example, UE-A 802 and UE-B 804 can obtain resource allocations from a network entity, depicted as a base station (BS) 806. As shown, UE-A 802 can send a scheduling request 808 to the base station 806 for a sidelink transmission. In response to the scheduling request, the base station can send a sidelink resource allocation 810 to UE-A 802. Using the sidelink resource (e.g., time and frequency resources) allocated by the base station 806, UE-A 802 sends a first sidelink transmission 812 to UE-B 804. Then, UE-B 804 can receive the first sidelink transmission 812 and, at 814, decode the received sidelink transmission. To respond to UE-A 802, UE-B 804 can send a scheduling request 816 to the base station 806. The base station 806 can send a sidelink resource allocation 818 to UE-B, and UE-B 804 can send a second sidelink transmission 820 utilizing the allocated sidelink resources. In some aspects, the base station 806 can select and allocate the sidelink resources for the second sidelink transmission 820 based at least in part on the sidelink resources allocated for the first sidelink transmission 812. In some aspects, a sidelink resource used for sending the first sidelink transmission can be mapped to one or more sidelink resources for the second sidelink transmission based on rules that are predefined, preconfigured, or known to the base station 806, UE-A 802, and UE-B 804. In this manner, UE-A 802 can maintain a knowledge of which sidelink resources to monitor for the second sidelink transmission.

In some aspects, UE-A and UE-B may share a sidelink resource pool. In such examples, UE-A 802 can indicate to UE-B 804 that it is a power-sensitive UE. That is, the first sidelink transmission from UE-A 802 may include an implicit or explicit indicator signifying that the first sidelink transmission was sent by a device that is power sensitive. In at least one example, the UE ID carried in the control information (e.g., SCI) may indicate that the UE is a power-sensitive device. For instance, in the example above where UE-A is a P-UE and where UE-B is a V-UE, the first sidelink transmission from the P-UE may include an indicator (e.g., signaling, parameter, message, etc.) to notify the V-UE that the first sidelink transmission was sent by a P-UE or power-sensitive UE. In response to such an indicator, the V-UE is informed to utilize the indicated sidelink resource(s) based on the first sidelink transmission. On the other hand, when no such indicator is present, the V-UE is informed that it does not need to determine any indicated sidelink resource(s) for the second sidelink transmission based on the resources used for the first sidelink transmission, but can instead identify a resource that it determines to be sufficient for sending the second sidelink transmission.

In some implementations, UE-A may utilize a sidelink resource pool dedicated to one or more types of power-sensitive devices. In such an implementation, UE-B receiving the first sidelink transmission in a resource dedicated to a power-sensitive UE will indicate to UE-B that one or more particular resources are to be utilized for sending the second sidelink transmission from UE-B to UE-A.

Figure 9:
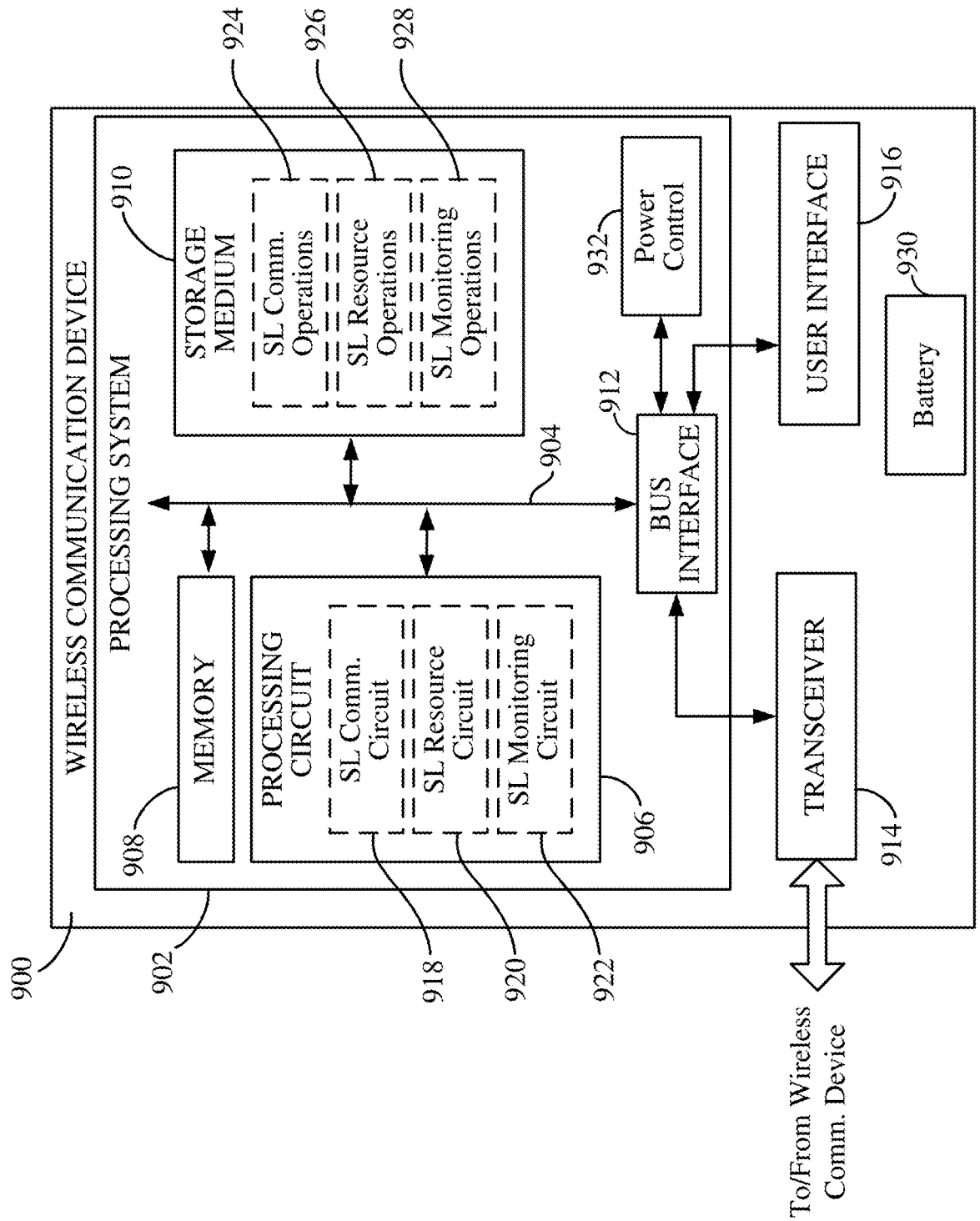
FIG. 9 is a block diagram illustrating select components of a wireless communication device employing a processing system according to at least one aspect.

FIG. 9 is a block diagram illustrating select components of a wireless communication device 900 employing a processing system 902 according to at least one aspect of the present disclosure. The wireless communication device 900 may be a power-sensitive wireless communication device, as described herein. A power-sensitive wireless communication device may have a limited power source (e.g., battery 930) that powers the device.

In this example, the processing system 902 is implemented with a bus architecture, represented generally by the bus 904. The bus 904 may include any number of interconnecting buses and bridges depending on the specific application of the processing system 902 and the overall design constraints. The bus 904 communicatively couples together various circuits including one or more processors (represented generally by the processing circuit 906), a memory 908, and computer-readable media (represented generally by the storage medium 910). The bus 904 may also link various other circuits such as timing sources, peripherals, voltage regulators, and power management circuits, which are well known in the art, and therefore, will not be described any further.

A bus interface 912 provides an interface between the bus 904 and a transceiver 914. The transceiver 914 provides a means for communicating with various other apparatus over a transmission medium or spectrum. For example, the transceiver 914 may include a receive chain (e.g., RF chain) to receive one or more wireless signals, and/or a transmit chain (e.g., RF chain) to transmit one or more wireless signals. Depending upon the nature of the apparatus, a user interface 916 (e.g., keypad, display, speaker, microphone, joystick, touchscreen) may also be provided.

The processing circuit 906 is responsible for managing the bus 904 and general processing, including the execution of software stored on the computer-readable storage medium 910. The software, when executed by the processing circuit 906, causes the processing system 902 to perform the various functions described herein for any particular apparatus. The computer-readable storage medium 910 and the memory 908 may also be used for storing data that is manipulated by the processing circuit 906 when executing software. As used herein, the term "software" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 906 is arranged to obtain, process and/or send data, control data access and storage, issue commands, and control other desired operations. The processing circuit 906 may include circuitry adapted to implement or execute desired software provided by appropriate media, and/or circuitry adapted to perform one or more functions described in this disclosure. For example, the processing circuit 906 may be implemented as one or more processors, one or more controllers, and/or other structure configured to execute executable software and/or execute specific functions. Examples of the processing circuit 906 may include a general purpose processor, a digital signal processor (DSP), an application specific integrated circuit (ASIC), a field programmable gate array (FPGA) and/or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 906 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 906 are for illustration and other suitable configurations within the scope of the present disclosure are also contemplated.

In some aspects, the processing circuit 906 may include a sidelink communication circuit 918, a sidelink resource circuit 920, a sidelink monitoring circuit 922, and a power control circuit 932. The various circuits may generally include circuitry and/or instructions (e.g., software stored on the storage medium 910) adapted to perform one or more of the functions, processes, or steps described herein with reference to FIGS. 1-8 and 10.

In some aspects, the wireless communication device 900 may include a power control circuit 932 that can be configured to power up and down various components of the wireless communication device 900. For example, the wireless communication device 900 can power down an RF chain (e.g., transceiver 914) to reduce power consumption in different scenarios.

The storage medium 910 may represent one or more computer-readable devices for storing software, such as processor executable code or instructions (e.g., software, firmware), electronic data, databases, or other digital information. The storage medium 910 may also be used for storing data that is manipulated by the processing circuit 906 when executing software. The storage medium 910 may be any available non-transitory media that can be accessed by a general purpose or special purpose processor, including portable or fixed storage devices, optical storage devices, and various other mediums capable of storing, containing and/or carrying software. By way of example and not limitation, the storage medium 910 may include a non-transitory computer-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other media for storing software, as well as any combination thereof.

The storage medium 910 may be coupled to the processing circuit 906 such that the processing circuit 906 can read information from, and write information to, the storage medium 910. That is, the storage medium 910 can be coupled to the processing circuit 906 so that the storage medium 910 is at least accessible by the processing circuit 906, including examples where the storage medium 910 is integral to the processing circuit 906 and/or examples where the storage medium 910 is separate from the processing circuit 906 (e.g., resident in the processing system 902, external to the processing system 902, or distributed across multiple entities).

Software stored by the storage medium 910, when executed by the processing circuit 906, can cause the processing circuit 906 to perform one or more of the various functions and/or process steps described herein. In at least some examples, the storage medium 910 may include sidelink communication operations 924, sidelink resource operations 926, and/or sidelink monitoring operations 928. The various operations may generally cause the processing circuit 906 to perform one or more of the functions, processes, or steps described herein with reference to FIGS. 1-8, 10, and 11. Thus, according to one or more aspects of the present disclosure, the processing circuit 906 is adapted to perform (independently or in conjunction with the storage medium 910 and transceiver 914) any or all of the processes, functions, steps, and/or routines for any or all of the wireless communication devices described in relation to FIGS. 1-8, 10, and 11.

Figure 10:
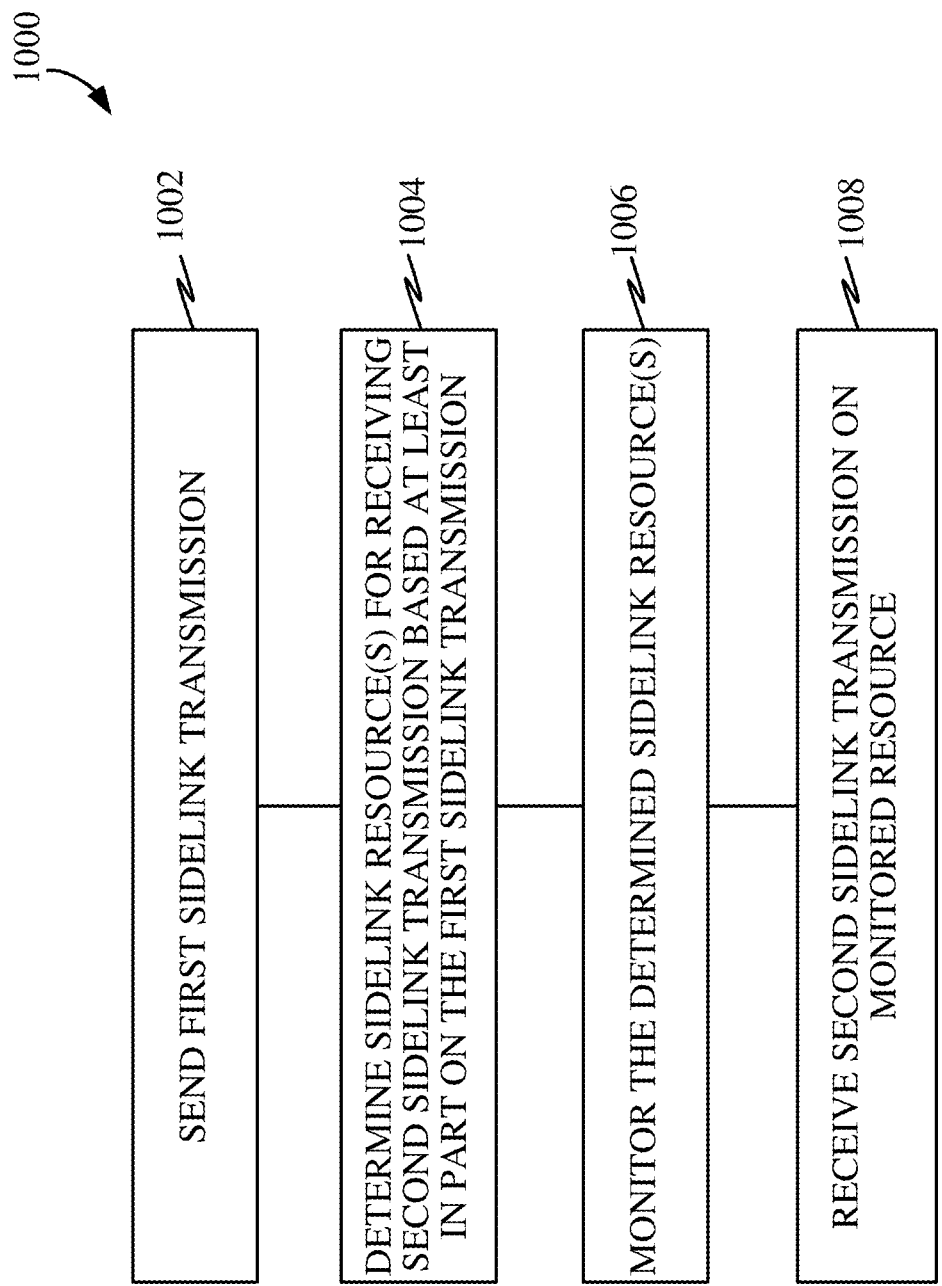
FIG. 10 is a flow diagram illustrating an access control method in sidelink communication according to some aspects.

Referring to FIG. 10, a flow diagram is shown illustrating a wireless communication method 1000 according to some aspects. In one example, the method 1000 can be operational at a wireless communication device 900 for sidelink communication. At 1002, the wireless communication device 900 may send or transmit a first sidelink transmission. For example, the processing system 902 may include logic and/or circuits (e.g., processing circuit 906 and/or operations on storage medium 910) to transmit the first sidelink transmission using a wireless communication resource via the transceiver 914. In one aspect, the sidelink communication circuit 918 and transceiver 914 can provide a means for transmitting the first sidelink transmission.

At block 1004, the wireless communication device 900 may determine one or more sidelink resources for receiving a second sidelink transmission based at least in part on the sent first sidelink transmission. For example, the processing system 902 may include logic and/or circuits (e.g., processing circuit 906 and/or operations on storage medium 910) to determine a sidelink resource, a sidelink resource window, a plurality of sidelink resources, or a plurality of sidelink resource windows for receiving the second sidelink transmission. The determination can be based at least in part on wireless resources used by the wireless communication device 900 to transmit the first sidelink transmission. In one aspect, the sidelink resource circuit 920 can provide a means for determining the one or more sidelink resources for receiving the second sidelink transmission based at least in part on the wireless resources (e.g., time and/or frequency resources) used to transmit the first sidelink transmission.

At block 1006, the wireless communication device 900 may then monitor the determined one or more sidelink resources for the second sidelink transmission. For example, the processing system 902 may include logic and/or circuits (e.g., processing circuit 906 and/or operations on storage medium 910) to monitor the determined sidelink resource(s) via the transceiver 914. In one aspect, the sidelink monitoring circuit 922 can provide a means for monitoring the determined one or more sidelink resources.

At 1008, the wireless communication device may receive the second sidelink transmission on the monitored one or more sidelink resources. For example, the processing system 902 may include logic and/or circuits (e.g., processing circuit 906 and/or operations on storage medium 910) to receive the second sidelink transmission via the transceiver 914 on one or more of the monitored resources. In one aspect, the sidelink communication circuit 918 can provide a means for receiving the second sidelink transmission.

Figure 11:
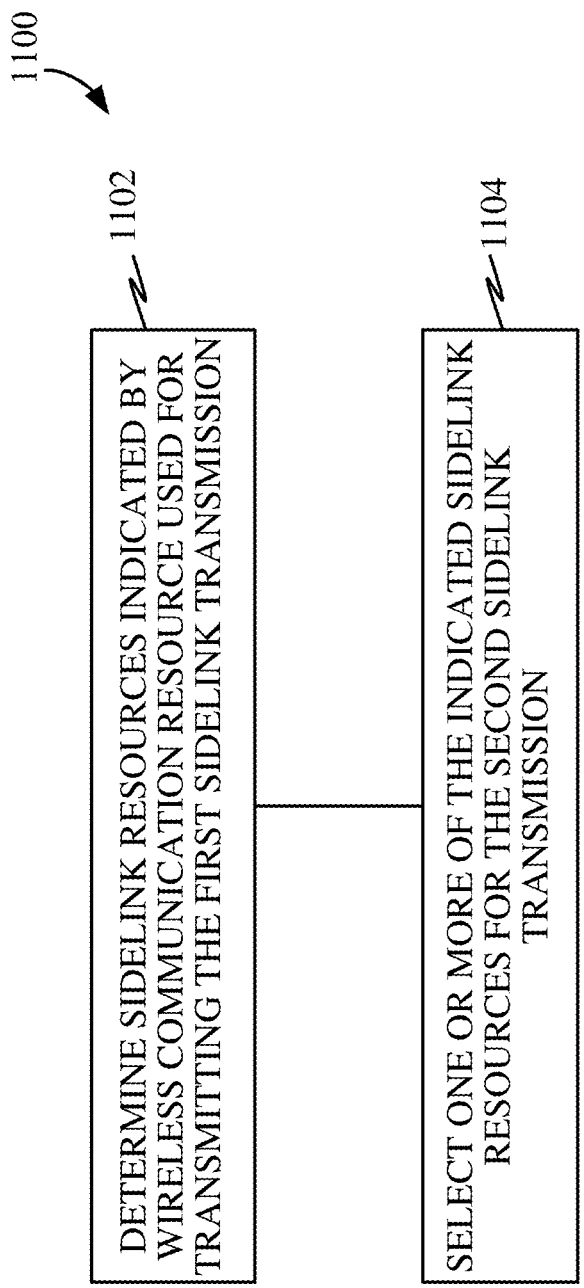
FIG. 11 is a flow diagram illustrating a resource selection method in sidelink communication according to some aspects.

Referring to FIG. 11, a flow diagram is shown illustrating a wireless resource selection method 1100 according to some aspects. In one example, the wireless resource selection method 1100 can be used by a wireless communication device 900 for selecting sidelink resources, for example, in block 1004 of the method 1000. At block 1102, the wireless communication device may determine sidelink resources indicated, expressly or implied, by the wireless communication resource used for transmitting the first sidelink transmission. For example, the wireless communication resource may include time and frequency resources (e.g., RBs 308) reserved, configured, or predefined for sidelink communication. In some aspects, the wireless communication resource of the first sidelink transmission may map to one or more sidelink resources that can be used for the second sidelink transmission. At block 1104, the wireless communication device may select one or more of the indicated sidelink resources for the second sidelink transmission. In one example, the wireless communication device may select the sidelink resources with the least interference and/or sidelink activities using a sensing procedure (e.g., LBT).

Figure 12:
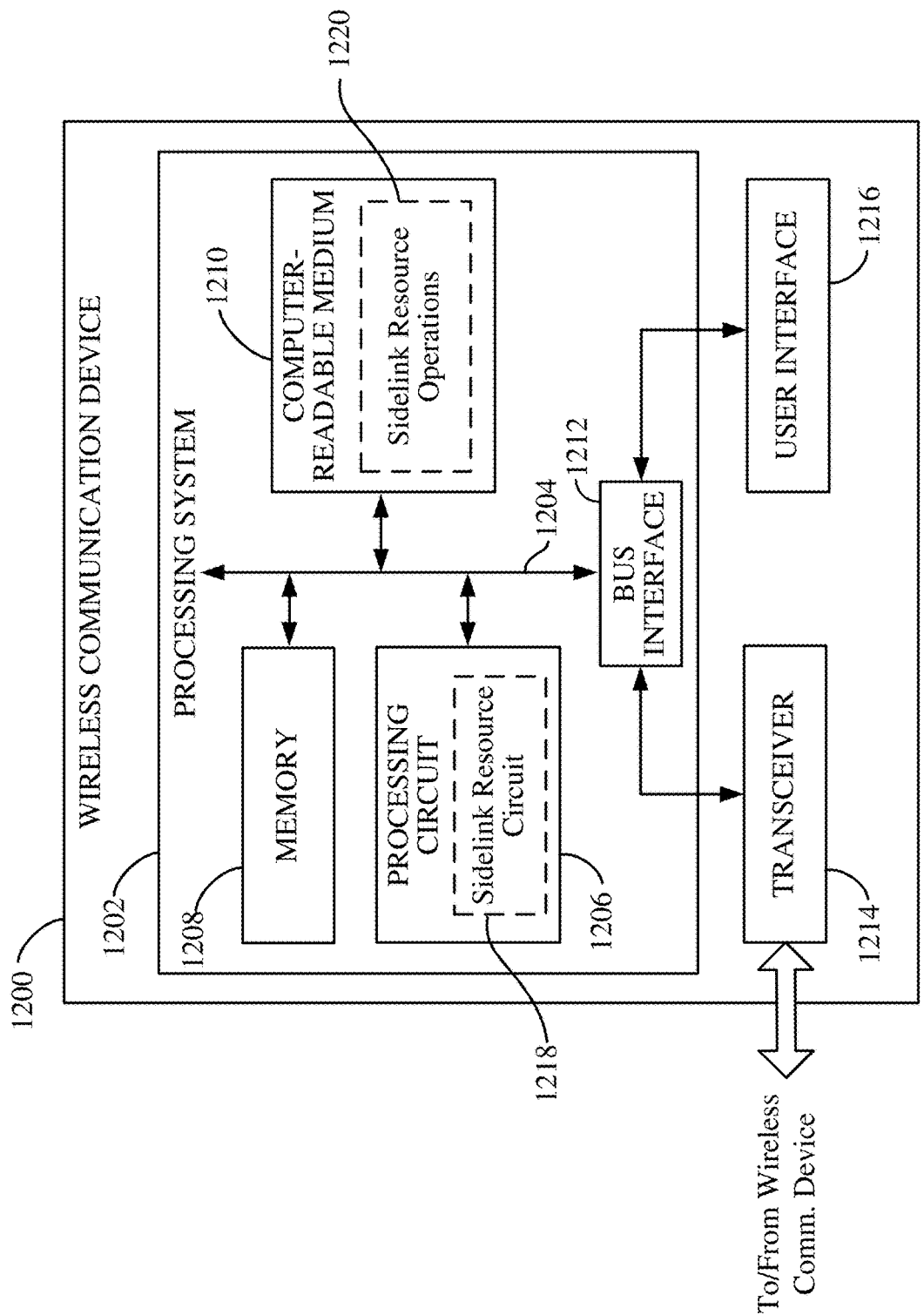
FIG. 12 is a block diagram illustrating select components of another wireless communication device employing a processing system according to at least one aspect.

FIG. 12 is a block diagram illustrating select components of another wireless communication device 1200 employing a processing system 1202 according to at least one example of the present disclosure. The wireless communication device 1200 may be configured to communicate with a power-sensitive wireless communication device, as described herein (e.g., wireless communication device 900).

Similar to the processing system 902 in FIG. 9, the processing system 1202 may be implemented with a bus architecture, represented generally by the bus 1204. The bus 1204 may include any number of interconnecting buses and bridges depending on the specific application of the processing system 1202 and the overall design constraints. The bus 1204 communicatively couples together various circuits including one or more processors (represented generally by the processing circuit 1206), a memory 1208, and computer-readable media (represented generally by the storage medium 1210). The bus 1204 may also link various other circuits such as timing sources, peripherals, voltage regulators, and power management circuits, which are well known in the art, and therefore, will not be described any further. A bus interface 1212 provides an interface between the bus 1204 and a transceiver 1214. The transceiver 1214 provides a means for communicating with various other apparatus over a transmission medium. For example, the transceiver 1214 may include a receive chain (e.g., RF chain) to receive one or more wireless signals, and/or a transmit chain to transmit one or more wireless signals. Depending upon the nature of the apparatus, a user interface 1216 (e.g., keypad, display, speaker, microphone, joystick, touchscreen) may also be provided.

The processing circuit 1206 is responsible for managing the bus 1204 and general processing, including the execution of software stored on the computer-readable storage medium 1210. The software, when executed by the processing circuit 1206, causes the processing system 1202 to perform the various functions described below for any particular apparatus. The computer-readable storage medium 1210 and the memory 1208 may also be used for storing data that is manipulated by the processing circuit 1206 when executing software.

The processing circuit 1206 is arranged to obtain, process and/or send data, control data access and storage, issue commands, and control other desired operations. The processing circuit 1206 may include circuitry adapted to implement or execute desired software provided by appropriate media in at least one example, and/or circuitry configured to perform one or more functions described in this disclosure. The processing circuit 1206 may be implemented and/or configured according to any of the examples of the processing circuit 906 described above.

In some instances, the processing circuit 1206 may include a sidelink resource circuit 1218. The sidelink resource circuit 1218 may generally include circuitry and/or software (e.g., executable instructions stored on the storage medium 1210) adapted to perform one or more of the functions, processes, or steps described herein with reference to FIGS. 1-8 and 12. As noted previously, reference to circuitry and/or software may be generally referred to as logic (e.g., logic gates and/or data structure logic).

The storage medium 1210 may represent one or more computer-readable devices for storing software, such as processor executable code or instructions (e.g., software, firmware), electronic data, databases, or other digital information. The storage medium 1210 may be configured and/or implemented in a manner similar to the storage medium 910 described above.

Software stored by the storage medium 1210, when executed by the processing circuit 1206, can cause the processing circuit 1206 to perform one or more of the various functions and/or process steps described herein. In at least some examples, the storage medium 1210 may include sidelink resource operations 1220 that cause the processing circuit 1206 to perform one or more of the functions, processes or steps described herein with reference to FIGS. 1-8 and 13. Thus, according to one or more aspects of the present disclosure, the processing circuit 1206 is adapted to perform (independently or in conjunction with the storage medium 1210) any or all of the processes, functions, steps and/or routines for any or all of the wireless communication devices described herein in relation to FIGS. 1-8 and 13.

Figure 13:
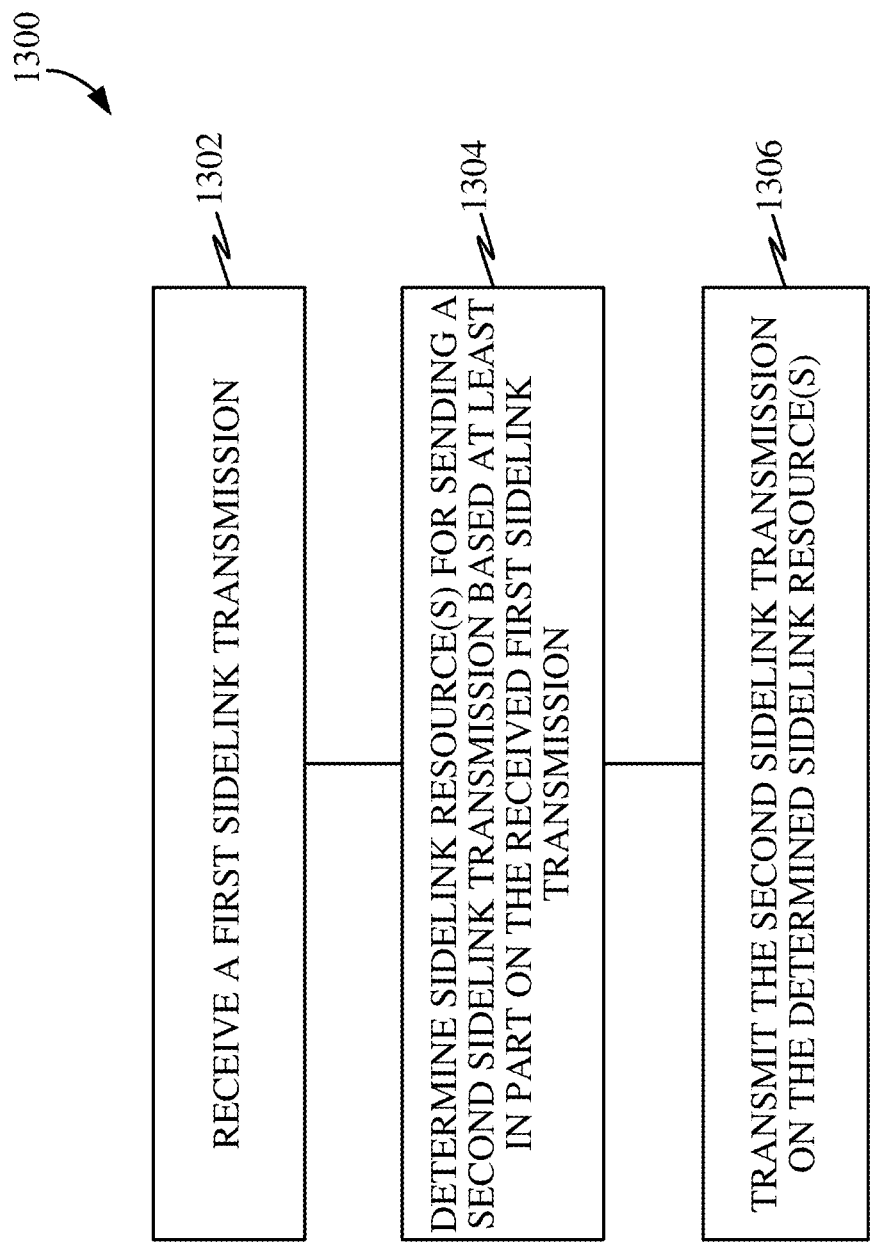
FIG. 13 is a flow diagram illustrating another access control method in sidelink communication according to some aspects.

Referring to FIG. 13, a flow diagram is shown illustrating a wireless communication method 1300 according to some aspects. In one aspect, the wireless communication method 1300 can be operational on or via a wireless communication device 1200. At 1302, the wireless communication device 1200 may receive a first sidelink transmission. For example, the processing system 1202 may include logic and/or circuits (e.g., processing circuit 1206 and/or operations on storage medium 1210) to receive the first sidelink transmission using a wireless communication resource via the transceiver 1214. In one aspect, the transceiver 1214 can provide a means for receiving the first sidelink transmission.

At block 1304, the wireless communication device 1200 may determine one or more sidelink resources for transmitting a second sidelink transmission based at least in part on the received first sidelink transmission. For example, the processing system 1202 may include logic and/or circuits (e.g., processing circuit 1206 and/or operations on storage medium 1210) to determine a sidelink resource, a sidelink resource window, a plurality of sidelink resources, or a plurality of sidelink resource windows for transmitting the second sidelink transmission. The determination is based at least in part on the wireless communication resource used by the wireless communication device 1200 to receive the first sidelink transmission. For example, the wireless communication device 1200 may use a method similar to the method 1100 to determine the sidelink resources for transmitting the second sidelink transmission. In one aspect, the sidelink resource circuit 1218 can provide a means for determining the one or more sidelink resources for transmitting the second sidelink transmission.

At 1306, the wireless communication device 1200 may transmit the second sidelink transmission on at least one of the determined one or more sidelink resources. For example, the processing system 1202 may include logic and/or circuits (e.g., processing circuit 1206 and/or operations on storage medium 1210) to send the second sidelink transmission via the transceiver 1214 on one or more of the determined resources. In one aspect, the transceiver 1214 can provide a means for transmitting the second sidelink transmission.

In one configuration, the wireless communication device 900 and/or 1200 includes means for performing the various functions and processes described in relation to FIGS. 10, 11, and 13. In one aspect, the aforementioned means may be the processor 906 or 1206 shown in FIG. 9 or 12 configured to perform the functions recited by the aforementioned means. In another aspect, the aforementioned means may be a circuit or any apparatus configured to perform the functions recited by the aforementioned means.

Of course, in the above examples, the circuitry included in the processor 906 or 1206 is merely provided as an example, and other means for carrying out the described functions may be included within various aspects of the present disclosure, including but not limited to the instructions stored in the computer-readable storage medium 910 or 1210, or any other suitable apparatus or means described in any one of the FIG. 1, 2, 4, 7, or 8, and utilizing, for example, the processes and/or algorithms described herein in relation to FIGS. 10, 11 and 13.

The following provides an overview of aspects of the present disclosure:

In a first aspect, wireless communication device includes a transceiver and a processing circuit communicatively coupled to the transceiver. The processing circuit is configured to: transmit a first sidelink transmission using a wireless communication resource via the transceiver; determine one or more sidelink resources for receiving a second sidelink transmission based at least in part on the wireless communication resource used to transmit the first sidelink transmission; monitor the determined one or more sidelink resources; and receive via the transceiver the second sidelink transmission on the monitored one or more sidelink resources.

In a second aspect, alone or in combination with the first aspect, to determine the one or more sidelink resources for receiving the second sidelink transmission, the processing circuit is further configured to determine at least one time window for receiving the second sidelink transmission, at least one frequency for receiving the second sidelink transmission, or at least one time and frequency resource for receiving the second sidelink transmission.

In a third aspect, alone or in combination with any of the first to second aspects, the one or more sidelink resources comprise periodic resources for receiving the second sidelink transmission.

In a fourth aspect, alone or in combination with any of the first to third aspects, the processing circuit is further configured to: power down one or more components of the transceiver after transmitting the first sidelink transmission; and power up the one or more components of the transceiver for receiving the second sidelink transmission using the determined one or more sidelink resources.

In a fifth aspect, alone or in combination with any of the first to fourth aspects, the processing circuit is further configured to: transmit the first sidelink transmission including an indicator to indicate the wireless communication device as a power-sensitive device.

In a sixth aspect, alone or in combination with any of the first to fifth aspects, to transmit the first sidelink transmission, the processing circuit is further configured to: sense the wireless communication resource for a period of time to determine that the wireless communication resource is available for sidelink communication.

In a seventh aspect, alone or in combination with any of the first to sixth aspects, the processing circuit is further configured to: transmit sidelink control information (SCI) via the transceiver, the SCI configured to indicate a size or location of the one or more sidelink resources.

In an eighth aspect, alone or in combination with any of the first to seventh aspects, a method of wireless communication at the wireless communication device.

In a ninth aspect, a wireless communication device includes a transceiver and a processing circuit communicatively coupled to the transceiver. The processing circuit is configured to: receive a first sidelink transmission using a wireless communication resource via the transceiver; determine one or more sidelink resources for transmitting a second sidelink transmission based at least in part on the wireless communication resource used to receive the first sidelink transmission; and transmit via the transceiver the second sidelink transmission on the one or more determined sidelink resources.

In a tenth aspect, alone or in combination with the ninth aspect, to determine the one or more sidelink resources for transmitting the second sidelink transmission, the processing circuit is further configured to: determine at least one time window for transmitting the second sidelink transmission, at least one frequency for transmitting the second sidelink transmission, or at least one time and frequency resource for transmitting the second sidelink transmission.

In an eleventh aspect, alone or in combination with any of the ninth to tenth aspects, the one or more sidelink resources comprise periodic resources for transmitting the second sidelink transmission.

In a twelfth aspect, alone or in combination with any of the ninth to eleventh aspects, the processing circuit is further configured to: receive sidelink control information (SCI) via the transceiver, the SCI configured to indicate a size or location of the one or more sidelink resources.

In a thirteenth aspect, alone or in combination with any of the ninth to twelfth aspects, the processing circuit is further configured to: receive the first sidelink transmission including an indicator that indicates the first sidelink transmission was sent by a power-sensitive device.

In a fourteenth aspect, alone or in combination with any of the ninth to thirteenth aspects, to determine the one or more sidelink resources for transmitting the second sidelink transmission, the processing circuit is further configured to: randomly select a resource of the one or more sidelink resources for transmitting the second sidelink transmission; or sense the one or more sidelink resources for a period of time to select a resource of the one or more sidelink resources for transmitting the second sidelink transmission.

In a fifteenth aspect, alone or in combination with any of the ninth to fourteenth aspects, to determine the one or more sidelink resources for transmitting the second sidelink transmission, the processing circuit is further configured to: transmit via the transceiver a scheduling request to a base station, the scheduling request configured to indicate the one or more sidelink resources for transmitting the second sidelink transmission.

In a sixteenth aspect, alone or in combination with any of the ninth to fifteenth aspects, a method of wireless communication at the wireless communication device.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP or combinations of such systems. These systems may include candidates such as 5G New Radio (NR), Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

While the above discussed aspects and arrangements are discussed with specific details and particularity, one or more of the components, steps, features and/or functions illustrated in FIGS. 1-13 may be rearranged and/or combined into a single component, step, feature or function or embodied in several components, steps, or functions. Additional elements, components, steps, and/or functions may also be added or not utilized without departing from the novel features of the present disclosure. The apparatus, devices and/or components illustrated in FIGS. 1, 2, 4, 8, 7, 9, and/or 13 may be configured to perform or employ one or more of the methods, features, parameters, and/or steps described herein with reference to FIGS. 1-13. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A first user equipment (UE), comprising:
a transceiver;
a memory; and
a processing circuit coupled to the transceiver and the memory, the processing circuit and the memory configured to:
transmit, to a second UE via the transceiver, a first sidelink transmission using a wireless communication resource;
determine one or more sidelink resources for receiving a second sidelink transmission based at least in part on the wireless communication resource used to transmit the first sidelink transmission,
the one or more sidelink resources comprising at least one time window for receiving the second sidelink transmission, at least one frequency for receiving the second sidelink transmission, or at least one time and frequency resource for receiving the second sidelink transmission;
monitor the one or more sidelink resources; and
receive, from the second UE via the transceiver, the second sidelink transmission on the one or more sidelink resources.

2. The first UE of claim 1, wherein the one or more sidelink resources comprise periodic resources for receiving the second sidelink transmission.

3. The first UE of claim 1, wherein the processing circuit and the memory are further configured to:
power down one or more components of the transceiver after transmitting the first sidelink transmission; and
power up the one or more components of the transceiver for receiving the second sidelink transmission using the one or more sidelink resources.

4. The first UE of claim 1, wherein the processing circuit and the memory are further configured to:
transmit the first sidelink transmission including an indicator to indicate the first UE as a power-sensitive device.

5. The first UE of claim 1, wherein, to transmit the first sidelink transmission, the processing circuit and the memory are further configured to:
sense the wireless communication resource for a period of time to determine that the wireless communication resource is available for sidelink communication.

6. The first UE of claim 1, wherein the processing circuit and the memory are further configured to:
transmit sidelink control information (SCI) via the transceiver, the SCI configured to indicate a size or location of the one or more sidelink resources.

7. A method of wireless communication at a first user equipment (UE), comprising:
transmitting, to a second UE, a first sidelink transmission using a wireless communication resource;
determining one or more sidelink resources for receiving a second sidelink transmission based at least in part on the wireless communication resource used to transmit the first sidelink transmission,
the one or more sidelink resources comprising at least one time window for receiving the second sidelink transmission, at least one frequency for receiving the second sidelink transmission, or at least one time and frequency resource for receiving the second sidelink transmission;
monitoring the one or more sidelink resources; and
receiving, from the second UE, the second sidelink transmission on the one or more sidelink resources.

8. The method of claim 7, wherein the one or more sidelink resources comprise periodic resources for receiving the second sidelink transmission.

9. The method of claim 7, further comprising:
powering down one or more components of the first UE after transmitting the first sidelink transmission; and
power up the one or more components of the first UE for receiving the second sidelink transmission using the one or more sidelink resources.

10. The method of claim 7, further comprising:
transmitting the first sidelink transmission including an indicator to indicate the first UE as a power-sensitive device.

11. The method of claim 7, wherein transmitting the first sidelink transmission comprises:

sensing the wireless communication resource for a period of time to determine that the wireless communication resource is available for sidelink communication.

12. The method of claim 7, further comprising:
transmitting sidelink control information (SCI), the SCI configured to indicate a size or location of the one or more sidelink resources.

13. A first user equipment (UE), comprising:
a transceiver;
a memory; and
a processing circuit coupled to the transceiver and the memory, the processing circuit and the memory configured to:
receive, from a second UE via the transceiver, a first sidelink transmission using a wireless communication resource;
determine one or more sidelink resources for transmitting a second sidelink transmission based at least in part on the wireless communication resource used to receive the first sidelink transmission,
the one or more sidelink resources comprising at least one time window for transmitting the second sidelink transmission, at least one frequency for transmitting the second sidelink transmission, or at least one time and frequency resource for transmitting the second sidelink transmission; and
transmit, to the second UE via the transceiver, the second sidelink transmission on the one or more sidelink resources.

14. The first UE of claim 13, wherein the one or more sidelink resources comprise periodic resources for transmitting the second sidelink transmission.

15. The first UE of claim 13, wherein the processing circuit and the memory are further configured to:
receive sidelink control information (SCI) via the transceiver, the SCI configured to indicate a size or location of the one or more sidelink resources.

16. The first UE of claim 13, wherein the processing circuit and the memory are further configured to:
receive the first sidelink transmission including an indicator that indicates the first sidelink transmission was sent by a power-sensitive device.

17. The first UE of claim 13, wherein, to determine the one or more sidelink resources for transmitting the second sidelink transmission, the processing circuit and the memory are further configured to:
randomly select a resource of the one or more sidelink resources for transmitting the second sidelink transmission; or
sense the one or more sidelink resources for a period of time to select a resource of the one or more sidelink resources for transmitting the second sidelink transmission.

18. The first UE of claim 13, wherein, to determine the one or more sidelink resources for transmitting the second sidelink transmission, the processing circuit and the memory are further configured to:
transmit via the transceiver a scheduling request to a base station, the scheduling request configured to indicate the one or more sidelink resources for transmitting the second sidelink transmission.

19. A method of wireless communication at a first user equipment (UE), comprising:
receiving, from a second UE, a first sidelink transmission using a wireless communication resource;
determining one or more sidelink resources for transmitting a second sidelink transmission based at least in part on the wireless communication resource used to receive the first sidelink transmission,
the one or more sidelink resources comprising at least one time window for transmitting the second sidelink transmission, at least one frequency for transmitting the second sidelink transmission, or at least one time and frequency resource for transmitting the second sidelink transmission; and
transmitting, to the second UE, the second sidelink transmission on the one or more sidelink resources.

20. The method of claim 19, wherein the one or more sidelink resources comprise periodic resources for transmitting the second sidelink transmission.

21. The method of claim 19, further comprising:
receiving sidelink control information (SCI), the SCI configured to indicate a size or location of the one or more sidelink resources.

22. The method of claim 19, wherein receiving the first sidelink transmission, comprises:
receiving the first sidelink transmission including an indicator that indicates the first sidelink transmission was sent by a power-sensitive device.

23. The method of claim 19, wherein determining the one or more sidelink resources for transmitting the second sidelink transmission, comprises:
randomly selecting a resource of the one or more sidelink resources for transmitting the second sidelink transmission; or
sensing the one or more sidelink resources for a period of time to select a resource of the one or more sidelink resources for transmitting the second sidelink transmission.

24. The method of claim 19, wherein determining the one or more sidelink resources for transmitting the second sidelink transmission, comprises:
transmitting a scheduling request to a base station, the scheduling request configured to indicate the one or more sidelink resources for transmitting the second sidelink transmission.

* * * * *